United States Patent
Nagaraj et al.

(10) Patent No.: US 10,044,414 B2
(45) Date of Patent: Aug. 7, 2018

(54) METHODS AND APPARATUS FOR COORDINATED MULTIPOINT COMMUNICATION

(71) Applicant: Nokia Solutions and Networks Oy, Espoo (FI)

(72) Inventors: Shirish Nagaraj, Hoffman Estates, IL (US); Michael Honig, Evanston, IL (US); Khalid Zeineddine, Evanston, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 210 days.

(21) Appl. No.: 14/879,546

(22) Filed: Oct. 9, 2015

(65) Prior Publication Data

US 2016/0105221 A1 Apr. 14, 2016

Related U.S. Application Data

(60) Provisional application No. 62/062,422, filed on Oct. 10, 2014.

(51) Int. Cl.
*H04W 72/04* (2009.01)
*H04B 7/024* (2017.01)
(Continued)

(52) U.S. Cl.
CPC ............ *H04B 7/024* (2013.01); *H04W 24/02* (2013.01); *H04W 28/16* (2013.01);
(Continued)

(58) Field of Classification Search
CPC .................................................. H04W 72/04
See application file for complete search history.

(56) References Cited

U.S. PATENT DOCUMENTS 9,155,054 B2* 10/2015 Kim ..................... H04L 5/001
2007/0275729 A1* 11/2007 Kashima ............... H04W 16/02
455/453
(Continued)

FOREIGN PATENT DOCUMENTS

EP 2496012 A1 9/2012
EP 2498530 A1 9/2012
(Continued)

OTHER PUBLICATIONS

Nagaraj, Shirish, et al., "Liquid Cooperative Networks: A Distributed Network Utility Maximization Approach for Multi-Antenna aperture Selection", Apr. 17, 2014, 18 pgs.
(Continued)

*Primary Examiner* — Edan Orgad
*Assistant Examiner* — Emmanuel Maglo
(74) *Attorney, Agent, or Firm* — Harrington & Smith

(57) ABSTRACT

Systems and techniques for managing helper cells in coordinated multipoint processing. Bandwidth assistance is requested from one or more cells operating in a network. In response to demand price and headroom information provided by a plurality of cells receiving the request, a set of potential helper cells is rank ordered and identified one or more helpers is identified from the ordered set and a candidate helper set is assembled based on bandwidth performance assistance criteria. A new request for bandwidth assistance is made. In response to new demand price and headroom information obtained from the candidate helper set, a determination is made whether sufficient iterations have been performed. If sufficient iterations have not been performed, the process is repeated, and if sufficient iterations have been performed, a requesting cell proceeds to operate while receiving bandwidth assistance from the assembled set.

19 Claims, 8 Drawing Sheets

(51) Int. Cl.
*H04W 28/16* (2009.01)
*H04W 24/02* (2009.01)
*H04W 72/08* (2009.01)

(52) U.S. Cl.
CPC ...... *H04W 72/082* (2013.01); *H04W 72/0426* (2013.01); *H04W 72/0453* (2013.01)

(56) References Cited

U.S. PATENT DOCUMENTS

| | | | |
|---|---|---|---|
| 2008/0188228 A1* | 8/2008 | Pecen | H04W 48/18 455/449 |
| 2010/0291956 A1* | 11/2010 | Iwamura | H04W 48/20 455/509 |
| 2012/0083309 A1* | 4/2012 | Kwon | H04B 17/24 455/522 |
| 2012/0190375 A1* | 7/2012 | Gu | H04B 7/024 455/450 |
| 2013/0029680 A1* | 1/2013 | Park | H04W 72/0406 455/450 |
| 2013/0034136 A1* | 2/2013 | Park | H04B 7/026 375/219 |
| 2013/0223272 A1 | 8/2013 | Tao et al. | |
| 2013/0242777 A1* | 9/2013 | Choi | H04W 72/0446 370/252 |
| 2014/0106695 A1 | 4/2014 | Luz et al. | 455/226.3 |
| 2014/0185565 A1 | 7/2014 | Li et al. | |
| 2014/0243002 A1* | 8/2014 | Muruganathan | H04W 72/0426 455/450 |
| 2014/0269526 A1* | 9/2014 | Mitola, III | H04L 5/0037 370/329 |
| 2014/0314000 A1* | 10/2014 | Liu | H04W 72/042 370/329 |
| 2015/0003301 A1* | 1/2015 | He | H04B 7/0452 370/280 |
| 2015/0109932 A1* | 4/2015 | Goldhamer | H04W 72/0453 370/236 |
| 2015/0141032 A1* | 5/2015 | Aydin | H04W 72/1226 455/452.2 |
| 2015/0334637 A1* | 11/2015 | Kim | H04W 48/12 370/312 |
| 2015/0358858 A1* | 12/2015 | Xue | H04W 28/08 370/231 |
| 2016/0036504 A1* | 2/2016 | Khojastepour | H04J 11/005 370/280 |

FOREIGN PATENT DOCUMENTS

| | | |
|---|---|---|
| WO | WO-2012/068421 A1 | 5/2012 |
| WO | WO-2012/127364 A1 | 9/2012 |
| WO | WO-2013/138521 A1 | 9/2013 |
| WO | WO-2015/169367-AI | 11/2015 |

OTHER PUBLICATIONS

Nagaraj, Shirish, "Signal Flow Protocol for Liquid Cooperative Networks: Use-case of LiquidMAAS", Jan. 13, 2016. Nokia, 5 pgs.

* cited by examiner

METHODS AND APPARATUS FOR COORDINATED MULTIPOINT COMMUNICATION

CROSS-REFERENCE TO RELATED APPLICATIONS

This application claims priority from U.S. Provisional Application No. 62/062,422, filed on Oct. 10, 2014 and incorporated herein by reference in its entirety.

FIELD OF THE INVENTION

The present invention relates generally to wireless communication. More particularly, the invention relates to improved systems and techniques for selection of cells for cooperative multipoint processing.

BACKGROUND

Efficient use of frequency resources is one of the most pressing issues in modern wireless communication systems. Modern wireless communication networks serve large numbers of users, many of whom consume large volumes of data services. Efficient use of the frequency bands used to provide such services is needed to avoid interference between users, and one of the ways that network operators achieve such efficient use is through cooperation between wireless network cells. Cells can cooperate so that, for example, smaller, shorter-range base stations can provide services to user devices within their range while larger, longer-range base stations can provide different services, using different frequencies, over a longer range. To take another example, user devices near a cell boundary between adjacent cells may receive services from each of the base stations serving the adjacent cells. Such multipoint cooperation generally allows for assembly of cell groups for cooperation, and considerable efficiency gains can be achieved through proper selection of cells for a cooperating group.

SUMMARY

According to one embodiment of the invention, an apparatus comprises at least one processor and memory storing a program of instructions. The memory storing the program of instructions is configured to, with the at least one processor, cause the apparatus to at least request bandwidth assistance from one or more cells operating in a network; in response to at least one of demand price information and headroom information provided by a plurality of cells receiving the request, identify a set of potential helper cells and place the potential helper cells in order by rank; select one or more helper cells from the ordered set and assemble a set of helper cells based on bandwidth performance assistance criteria; determine whether the set of helper cells is suitable for use; and in response to a determination that the set of helper cells is suitable for use, proceed to operate while receiving bandwidth assistance from the set of helper cells.

According to another embodiment of the invention, a method comprises requesting bandwidth assistance from one or more cells operating in a network; in response to at least one of demand price information and headroom information provided by a plurality of cells receiving the request, identifying a set of potential helper cells and placing the potential helper cells in order by rank; selecting one or more helper cells from the ordered set and assembling a set of helper cells based on bandwidth performance assistance criteria; determining whether the set of helper cells is suitable for use; and in response to a determination that the set of helper cells is suitable for use, proceeding to operate while receiving bandwidth assistance from the set of helper cells.

According to another embodiment of the invention, a computer readable medium stores a program of instructions. Execution of the program of instructions by at least one processor configures an apparatus to at least request bandwidth assistance from one or more cells operating in a network; in response to at least one of demand price information and headroom information provided by a plurality of cells receiving the request, identify a set of potential helper cells and place the potential helper cells in order by rank; select one or more helper cells from the ordered set and assemble a set of helper cells based on bandwidth performance assistance criteria; determine whether the set of helper cells is suitable for use; and in response to a determination that the set of helper cells is suitable for use, proceed to operate while receiving bandwidth assistance from the set of helper cells.

According to another embodiment of the invention, an apparatus comprises at least one processor and memory storing a program of instructions. The memory storing the program of instructions is configured to, with the at least one processor, cause the apparatus to at least receive at least one help request from at least one recipient cell seeking bandwidth assistance in cooperative multipoint processing; and compute and broadcast at least one of demand price information and headroom information to the at least one recipient cell.

DETAILED DESCRIPTION

Enabling cooperation between cells involves communication between cells in order to coordinate their activities. For example, uplink cooperation involves sending signal samples from a "helper" cell to a "recipient cell. The category of "helper" or "recipient" cell is not a fixed category, but may instead be thought of as an operational category—that is, a role being filled by the cell at a particular time. A "recipient" cell may be thought of as belonging to a first operational category in which the cell seeks bandwidth assistance from another cell, and a "helper" cell able to provide, or considered for providing, such assistance, may be thought of as belonging to a second operational category. Cells may change categories as network conditions and loads change. In addition, cells may fall into different categories with respect to other cells—a cell may be a "recipient" cell with respect to a cell able to provide it assistance, and at the same time may be a "helper" cell with respect to a cell needing assistance which it is situated to provide. One example of a helper cell is a cell providing bandwidth assistance to a recipient cell, and one advantageous implementation of operation of cells as helper and recipient cells is in small-cell cluster configurations.

Signal samples and other information which may be sent between "recipient" and "helper" cells may be exchanged using a side-haul or backhaul network. If the backhaul network is not a bottleneck, and cells can obtain help from any other cells they deem suitable without any constraints, the problem is simple. However, for some deployments and hardware architectures, the backhaul is severely limiting. In such cases it is not always possible for a cell to obtain cooperation from its "ideal" set of helping cells. One or more embodiments of the present invention therefore provide mechanisms for selecting cells to engage in cooperative multipoint communication while taking into account backhaul architectural constraints, and providing for a specified measure of network utility (for example, in terms of user throughput).

Figure 1:
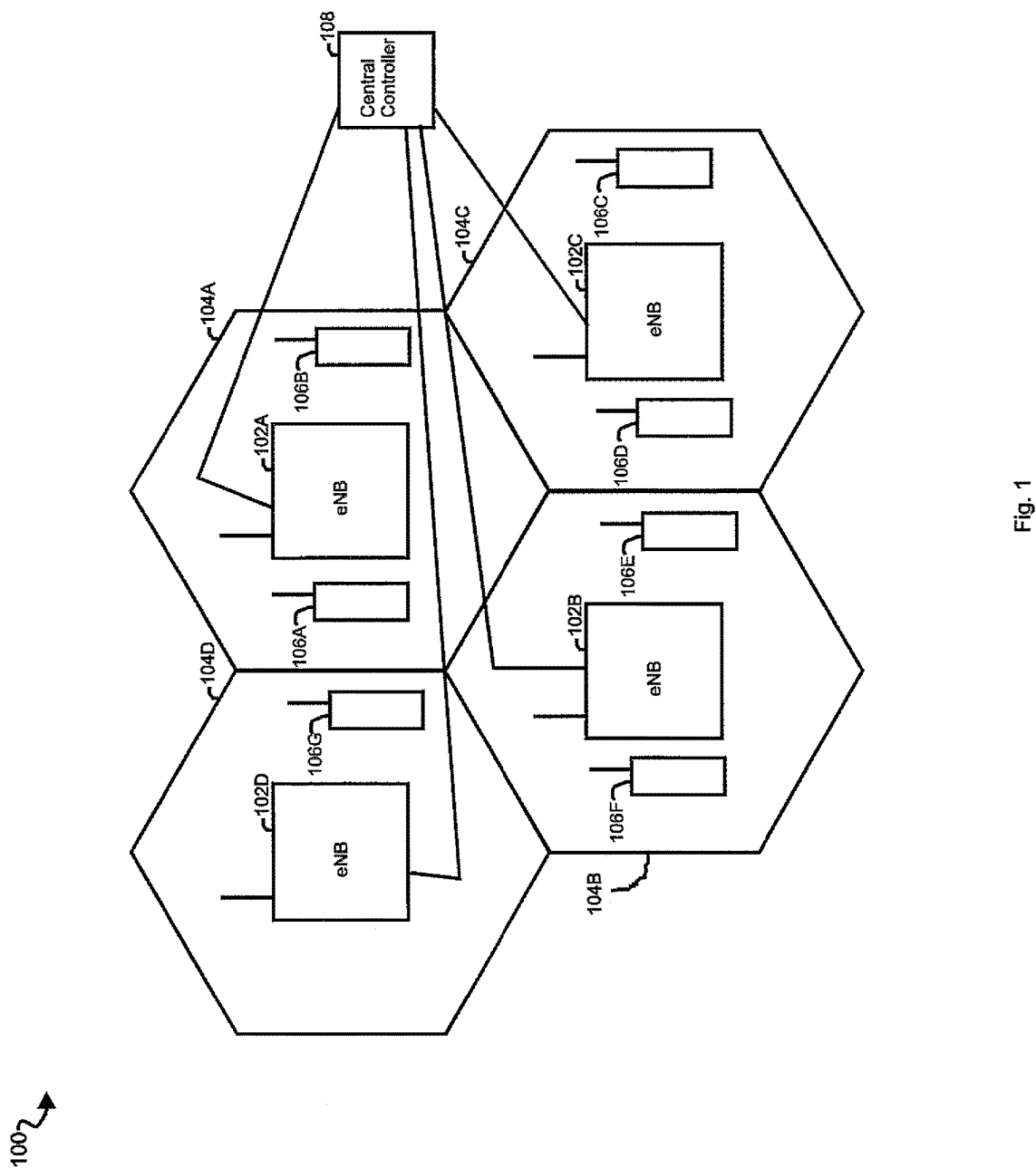
FIG. 1 illustrates a wireless network according to an embodiment of the present invention.

FIG. 1 illustrates a network configuration 100, comprising base stations 102A-102D, defining cells 104A-104D, respectively. The cells serve a set of UEs 106A-106E. For cooperative multipoint communication, one or more of the cells 104A-104D may need help from another cell—this help can be in the form of baseband signals (for joint reception-based UL CoMP, or JR-CoMP), or decoded data (for distributed interference cancellation-based CoMP, or DIC-CoMP), or modulated waveform (for joint transmission-based DL CoMP or JT-CoMP).

Each of the cells 104A-104D cell has its own limitations in terms of backhaul bandwidth, so that the amount of help it can provide is limited accordingly.

Cells therefore can communicate information indicating their bandwidth limitations, so that recipient cells seeking helper cells are aware of the limitations to which potential helper cells are subject. One or more elements of the network may perform analysis to determine helper cell set configurations for each of one or more of the recipient cells. A number of alternative approaches are possible. In one or more embodiments of the invention, a central controller 108 may receive data from each of one or more cells and the network environment generally and perform the analysis. In one or more other embodiments of the invention, each of one or more cells may perform its own analysis.

Figure 2:
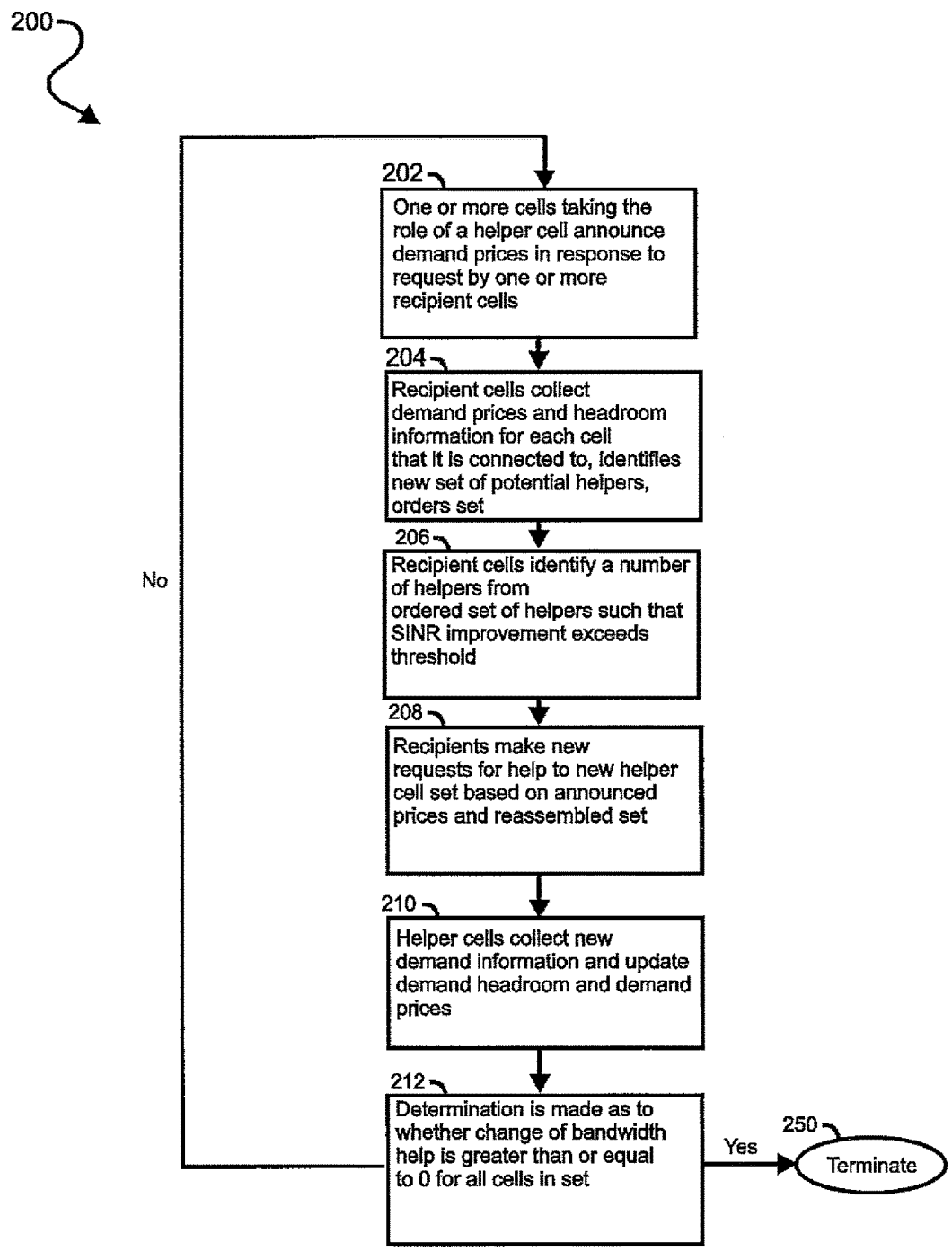
FIG. 2 illustrates a process according to an embodiment of the present invention.

FIG. 2 illustrates a process 200 according to an embodiment of the present invention, undertaken whenever a selection of helper cells is to be made by one or more recipient cells. Selection may be initiated, for example, whenever a recipient cell makes a request or other indication that it needs or may need additional bandwidth. At block 202, upon a request by one or more recipient cells, one or more cells taking a role of helper cells announce a "demand price" $\{u\}_k(t-1)$ (a non-negative number) based on its bandwidth utilization, and/or a demand headroom $=\{\Delta\}_k(t-1)$ (this is a real number, specifying the difference between the bandwidth limit and the current requested bandwidth) to its potential recipient cells. The demand price $\mu_k(t)$ may be determined and updated iteratively based on bandwidth help requests between cells. The demand price thus represents a computation based on the impact on, or cost to, the helper—that is, how much of its spare bandwidth space is used.

At block 204, the "recipient cell" collects the demand price values and headroom information from one or more helper cells to which it is connected, and identifies a new set of potential helpers based on this information. Each new set of helpers is specific to the problem being solved. For example in the case of UL JR-CoMP, a recipient may determine the incremental signal to noise ratio improvement that would be achieved from the contribution of the helper cell, penalize for the demand price associated with that cell, and order cells according to this metric. At block 206, each recipient cell identifies a certain number of helpers from this ordered set of helpers—for example, identifying helpers that will provide assistance such that the normalized SINR improvement exceeds a specified threshold.

At block 208, each recipient cell makes a new request for help to the new helper cell set created in block 204, based on the announced prices and the re-assembled set of helper cells. At block 210, the helper cells collect new demand information from recipient cells and update the demand headroom to be the difference between the bandwidth limit and the new requested bandwidth. They also update their demand prices, for example, as follows:

$$\mu_k(t) = \max(\mu_k(t-1)\nu\Delta_k(t), 0)$$

where $$\Delta_k(t) = \sum_{j \text{ among all helpers}} [(\overline{B\pi} - BW_{j \rightarrow k}](t)).$$

and where $BW_{j \rightarrow k}(t)$ is the bandwidth help requested by cell j to cell k during iteration t, $\overline{B\pi}$ is the backhaul bandwidth limit and u>0 is a small step-size.

At block 212, a determination is made as to whether convergence has been achieved—that is, that $\Delta_k(t) \geq 0$ for all helper cells k. If no, the process returns to block 202. If yes, the process terminates at block 250. As an alternative, the process may simply proceed for a specified number of iterations. Whether to terminate the process after a specific number of iterations, or based on meeting a criterion such as convergence, need not be inflexibly determined for a particular system, but may be changeable based on any suitable criteria desired.

Figure 3:
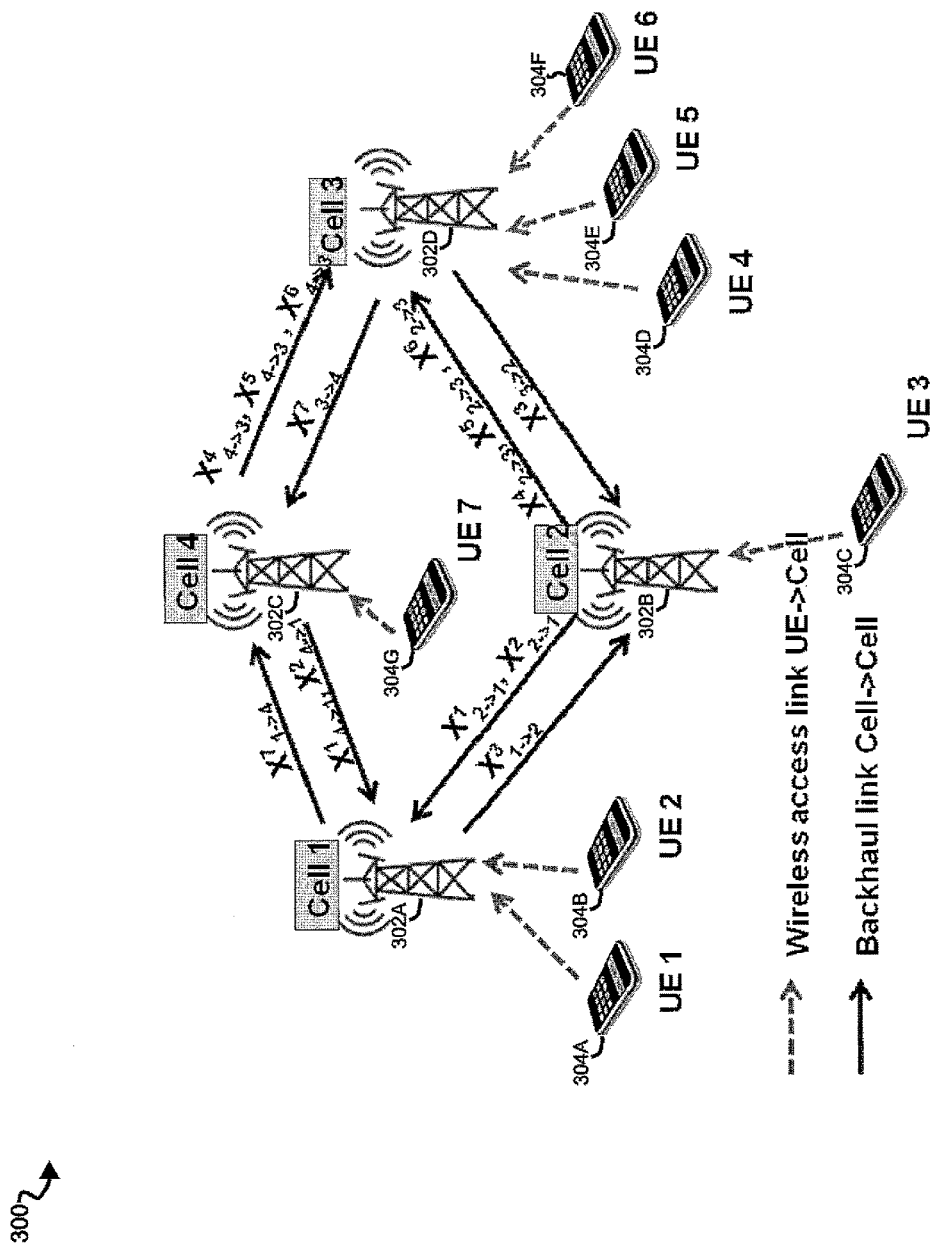
FIG. 3 illustrates an arrangement of cells according to an embodiment of the present invention.

FIG. 3 illustrates an exemplary arrangement 300 according to an embodiment of the present invention. Four cells 302A-302D (which may be manifested by 3GPP eNBs) serve user devices, or 3GPP UEs, 304A-304G, respectively. In the present example, the UEs 302A and 302B are connected to the cell 302A, the UE 304C is connected to the cell 302B, the UEs 304D-304F are connected to the cell 302D, and the UE 304G is connected to the cell 302C. The cells are connected by backhaul links.

Figure 4:
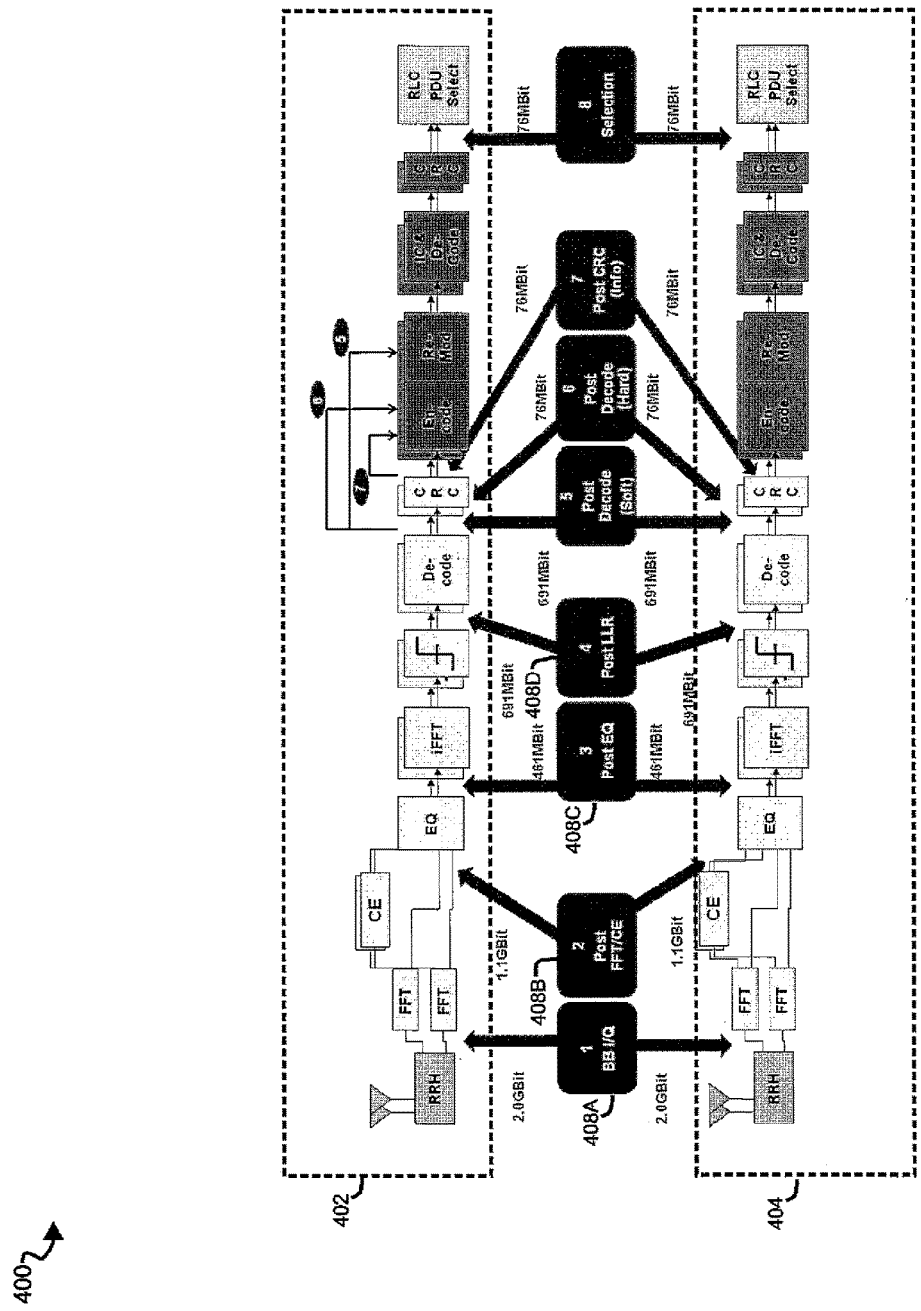
FIG. 4 illustrates information sharing between base station receivers according to an embodiment of the present invention.

FIG. 4 illustrates first and second receivers 402 and 404 typical of receivers that may be used in cells such as the cells 302A-302D of FIG. 3. FIG. 4 illustrates baseband data sharing at various points in the processing chain. Mechanisms described below are available in cases in which the baseband data shared between cells is available at points 408A-408D.

Figure 5:
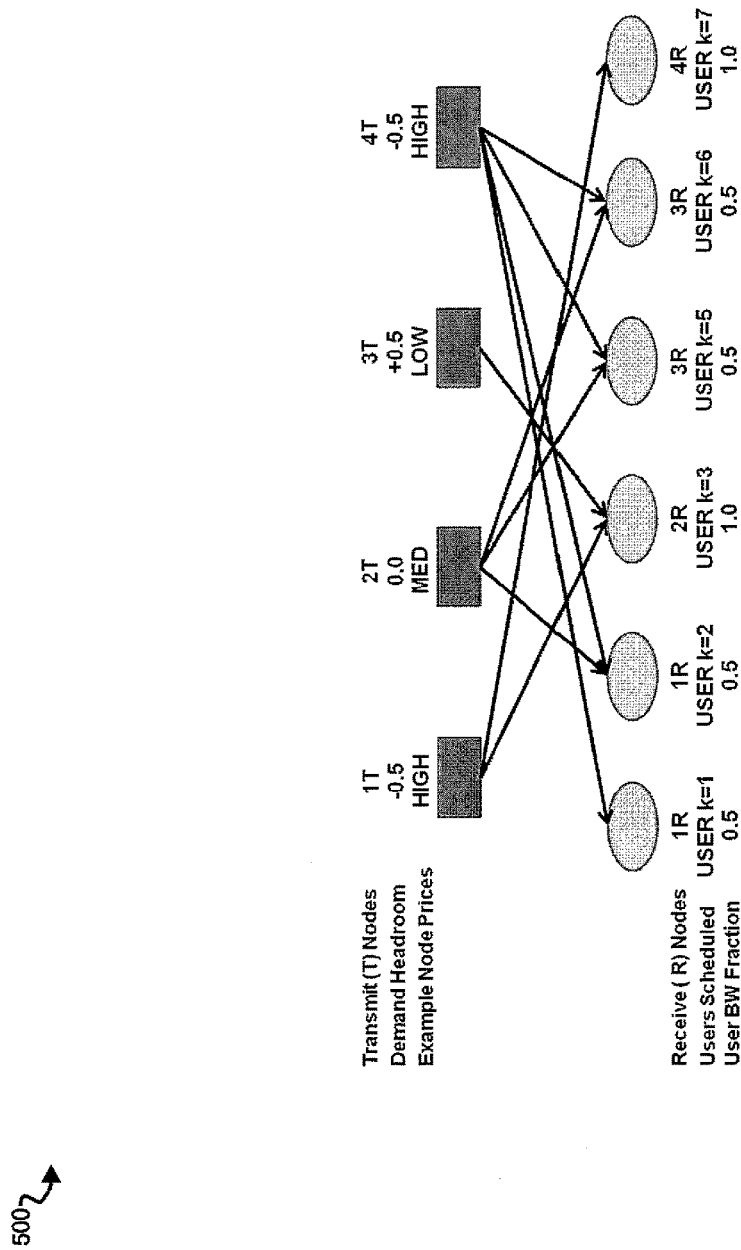
FIG. 5 illustrates relationships between helper and recipient cells according to an embodiment of the present invention.

FIG. 5 is a logical arrangement 500 of four cells, with their functioning logically separated between operation as "transmit nodes" and "receive nodes." Transmit nodes correspond to helper cells and receive nodes correspond to recipient cells. Transmit nodes are nodes that are sharing their antenna data with other cells, and receive nodes that are requesting antenna data from other cells to aid in user reception. The cells may be thought of as cells 1, 2, 3, and 4, and in the present example, each of the cells manifests itself as a transmit cell and as one or more instances of a receive cell (although it will be recognized that not every cell will manifest itself as a transmit cell or as a receive cell in every instance).

The structure illustrated in FIG. 500, illustrates a manifestation of each cell as one transmit node and as one or more receive nodes, with a receive node being manifested for each cells manifest themselves as receiving cells for each scheduled user for which they are seeking data sharing. Thus, FIG. 5 illustrates two receive nodes for cell 1 (for users k=1 and k=2), a single receive node for cell 2 (for user k=3), two receive nodes for cell 3 (for users k=5 and k=6), and a single receive node for cell 4 (for user k=7).

Each cell distributes bandwidth among its users, and each manifestation of a receive node has an associated user bandwidth fraction. Each manifestation of a transmit node has an associated demand headroom (based at least in part on the bandwidth it must deliver to its own users) and an associated "price" indicating the impact on the transmit node of delivering shared data. The table below indicates parameters associated with the sharing arrangement illustrated in FIG. 3.

| Cells | 1 | 2 | 3 | 4 |
|---|---|---|---|---|
| Users scheduled | 1.2 | 3 | 5.6 | 7 |
| Egress BW | 2.0 | 1.5 | 1.0 | 2.0 |
| Ingress Aperture | 1 for user 1<br>2 for user 2 | 2 for user 3 | 2 for user 5<br>2 for user 6 | 1 for user 7 |
| Demand Overhead | −0.5 | 0.0 | +0.5 | −0.5 |
| Demand Price | High | Med | Low | High |

Following are notations used in assembling a collaborative group of cells:

$\mathcal{J}$: Set of all cells in the network, with $J=\|\mathcal{J}\|$

σ(k): Serving cell for user k u(j)={k∈u: user k is connected to cell j}: Set of users connected to cell j.

$x_{i \to j}^{k} \in \{0,1\}$: indicates if cell i is sharing its post-FFT antenna (or local cell-combined) data with cell j, for the user k being served by cell j.

$S_{i \to j}^{k}$: SINR (averaged across local antennas or locally post-combined) experienced by user k (which is connected to cell j) at the antennas of cell i.

$\beta_k$: Bandwidth fraction allocated to user k at a particular TTI. If a user is not scheduled in that TIE, $\beta_k=0$.

$\omega_k$: Scheduling priority weight for user k at a particular TTI, typically set to $$\frac{1}{T_k}$$

where $T_k$ is the IIR-filtered scheduled throughput of user k. It could also incorporate user-specific extra-neous priority weights in addition, set to differentiate users based on Quality of Experience (QoE).

$L_A$: Maximum number of helper cells that is possible for a user's receiver to process (usually set to 3 for a maximum of 8-Rx receivers, for cells with 2-Rx antennas each). This is a constraint arising from computational complexity considerations.

$\mathcal{N}_R(k)$, k∈u(j): Ingress neighborhood ("receive") cells for user k in cell j. Defined typically as the set of cells where the user's SINR is above a minimum threshold value (usually −10 dB). That is, $\mathcal{N}_R(k)=\{i \in \mathcal{J}, i \neq \sigma(k): S_{i \to j}^{k} \geq S_{min}\}$, $L_R(k)=\min\{L_A, |\mathcal{N}_R(k)|\}$: This is the maximum aperture (in terms of helper cells) that can be allowed for the receiver of user k∈u(j). This is the per-user ingress limit.

$\bar{\mathcal{N}}_R(j)=\cup_{k \in u(j)} \mathcal{N}_R(k)$: Union of ingress neighborhood cells for all users in a given cell. This is the set of all helper cells for a given cell across all its users.

$\bar{\mathcal{N}}_T(i)$: Egress neighborhood for cell i, defined as the set of cells for which cell i is in their Ingress neighborhood. In other words, the set of cells which can potentially gain from cell i sharing its antenna data. $\bar{\mathcal{N}}_T(i)=\{j \in \mathcal{J}, j \neq i: i \in \mathcal{N}_R(j)\}$.

$L_T$: Maximum number of cells to which a particular cells' antenna data can be shared with. This is the per-cell egress limit coming from inter-connect bandwidth constraints.

$L_R$: This is an ingress constraint for the cell that accounts for hardware or inter-connect bandwidth limitations. Note that this is different from the per-user aperture constraint in that it is a constraint on the maximum amount of backhaul bandwidth that can be consumed by a receiver processing unit, which arises from processor input limitations and inter-connect bandwidth limitations. The aperture constraint, on the other hand, arises out of computational complexity considerations, and is the number of inputs that can be taken by a receiver (independent of the bandwidth of the user's allocation).

FIG. 3 shows an example of 4 cells with 7 users in all. The cells 1 through 4 have 2, 1, 3, and 1 user(s) respectively. The possible sharing variables are also shown along with the inter-connect. Note that Cells 1 and 3, and Cells 2 and 4 do not exchange information among themselves. This defines a local neighborhood for users in each cell as follows:

$\mathcal{N}_R(1)=\mathcal{N}_R(2)=\{2;4\}; \mathcal{N}_R(3)=\{1;3\};$ $\mathcal{N}_R(4)=\mathcal{N}_R(5)=\mathcal{N}_R(6)=\{2;4\}; \mathcal{N}_R(7)=\{1;3\}$ The receive aperture size limit for each user is: $L_R(k)=2 \forall k \in u(j); \forall j=\{1; 2; 3; 4\}$, assuming LA≥2. The egress neighborhoods are:

$\bar{\mathcal{N}}_T(1)=\{2;4\}; \bar{\mathcal{N}}_T(2)=\{1;3\}; \bar{\mathcal{N}}_T(3)=\{2;4\};$ $\bar{\mathcal{N}}_T(4)=\{1;3\}$ One or more embodiments of the present invention provide mechanisms for maximizing the weighted sum rate across all users in the network, given a schedule of users that are transmitting in a given transmission time interval (TTI). The formulation is one of deciding on per-user antenna connectivity/sharing, where the antenna-sharing decision is made after scheduling and reception of the signals. The objective is to maximize sum utility subject to constraints on the ingress aperture and egress bandwidth. We assume that a user is always processed by its own cell's antennas. The multi-antenna co-operative receiver assumption is that if a cell's antennas are included in the aperture of a user, the cell does local processing of that user's signals (either using IRC or MRC using its own antennas), and forwards those post-combined signals to the serving cell, which in turn does a simple (MRC) combining of the signals from different cells.

In one or more embodiments, this can be achieved by solving the following optimization problem:

Maximize $\sum_{j \in \mathcal{J}} \sum_{k \in u(j)} \omega_k \beta_k \log\left[1 + S_{j \to j}^k + \sum_{i \in N_R(k)} S_{i \to j}^k x_{i \to j}^k\right]$ (1)

Subject to:

Ingress Aperture Limit $\sum_{i \in N_R(k)} x_{i \to j}^k \leq L_R(k) \forall j \in \mathcal{J}, \forall k \in u(j)$ (2)

Egress Bandwidth Limit $\sum_{l \in N_T(i)} \sum_{s \in \sigma(l)} \beta_S x_{i \to l}^s \leq L_T \forall i \in \mathcal{J}$ (3)

Sharing Variable: $x_{i \to j}^k \in \{0, 1\} \forall j \in \mathcal{J}, \forall k \in u(j), \forall i \neq j$ (4)

The cost function is concave and the inequality constraints are linear. The problem thus is a convex optimization problem if the variables are relaxed to be $0 \leq x_{i \to j}^k \leq 1$. A fractional value, for the sharing variable interprets a helper cell a sending only part of the RBs for a user's processing. Since this is quite acceptable within the inter-connect architecture, and also within receiver processing, the variables can be relaxed as above to obtain a convex NUM formulation.

The ingress constraint, which may be a computational complexity constraint based on the maximum number of antenna/cell signals that can be processed by the receiver, is independent of the allocated bandwidth fraction of the user. The egress constraint, on the other hand, is a backhaul communication bandwidth constraint, and hence accounts for the bandwidth fraction a user's signal occupies in determining the overall backhaul bandwidth consumed. In addition to the computational complexity-based ingress constraint in Equation (2), a constraint might be encountered in the form of a limitation on real ingress bandwidth, arising out of hardware or backhaul inter-connect constraints. This might take the form of:

$$\sum_{k \in u(j)} \sum_{i \in N_{(R)(k)}} x_{i \to j}^k \leq L_R \forall j \in \mathcal{J}$$

This equation can be bounded as follows:

$$\sum_{k \in u(j)} \sum_{i \in N_R(k)} x_{i \to j}^k \leq L_A \sum_{k \in u(j)} \beta_k \leq L_A \forall j \in S$$

given full bandwidth utilization in the cell, that is, $$\sum_{k \in u(j)} \beta_k = 1.$$

Typically, $L_{\overline{R}} > L_A$, so this constraint is not binding, and only the per-user aperture constraint of Equation (2) is retained in the formulation.

Constraint (3) is the only coupling constraint. If there were no such constraint, the solution would be straightforward: order the cells according to the SINRs, and choose min$\{L_A; L_R(k)\}$ top cell candidates for receiver processing.

As noted above with respect to FIG. 5 the users scheduled are $\{1, 2, 3, 5, 6, 7\}$ As noted above, every may be thought to have to potential layers of function: one layer where each cell sends its data to other cells to help their reception, and another layer where cell's receive antenna data from a set of helper cells in order to perform their signal reception. The bandwidth fraction allocated to the users are $\{0:5; 0:5; 1:0; 0:5; 0:5; 1:0\}$ respectively. A particular solution of interconnects is shown in FIG. (5). The number of input lines coming into the receiver of each user defines the ingress aperture size. In this solution, the ingress aperture can be seen to be $\{1; 2; 2; 2; 2; 1\}$ respectively.

On the egress side, Cell 1 sends its data to two users, one each in Cells 2 and Cell 4, incurring an egress bandwidth overhead of 2.0 (since each of those users occupies the whole bandwidth in their respective cells). Cell 4 sends its data to two users in Cell 1 (each with a bandwidth fraction of 0.5), and two users in Cell 3 (each with a bandwidth fraction of 0.5), giving a total egress bandwidth for Cell 4 of 2.0. If, for example, the egress bandwidth limit in the system were 1.5 (that is, each cell was allowed a maximum of 150% of system bandwidth to share with other cells), then we can see that the demand headroom (allowed budget minus the current sharing bandwidth) would be $\{-0:5; 0:0; +0:5, -0:5\}$ respectively for the four cells.

From this notion of demand headroom, we can note that Cells 1 and 4 are in high demand, followed by Cell 2 and then Cell 3. This notion of demand headroom and demand price is discussed in greater detail below.

The Lagrangian for the network utility maximization problem given above is as follows:

$$\mathcal{L}(x, \lambda, \mu, \kappa) = \sum_{j \in \mathcal{J}} \sum_{k \in u(j)} \omega_k \beta_k \log\left[1 + S_{j \to j}^k + \sum_{i \in N_R(k)} S_{i \to j}^k x_{i \to j}^k\right] +$$
$$\sum_{j \in \mathcal{J}} \sum_{k \in u(j)} \lambda_k \left(L_A - \sum_{i \in N_R(k)} x_{i \to j}^k\right) + \sum_{i \in \mathcal{J}} \mu_i \left(L_T - \sum_{l \in N_T(i)} \sum_{s \in \sigma(i)} \beta_S x_{i \to l}^s\right) +$$
$$\sum_{j \in \mathcal{J}} \sum_{k \in u(j)} \sum_{i \in N_R(k)} \kappa_{i,k}(1 - x_{i \to j}^k) + \sum_{j \in \mathcal{J}} \sum_{k \in u(j)} \sum_{i \in N_R(k)} \theta_{i,k} x_{i \to j}^k$$

for $\mu_i, \lambda_k, \kappa_{i,k}, \theta_{i,k} \geq 0$.

The KKT conditions for the solution are as follows:

$$\frac{\partial \mathcal{L}(x, \lambda, \mu, \kappa, \theta)}{\partial x_{i \to j}^k} = \qquad (6)$$

$$\frac{\omega_k \beta_k S_{i \to j}^k}{\left[1 + S_{j \to j}^k + \sum_{m \in N_R(k)} S_{m \to j}^k x_{m \to j}^k\right]} - \lambda_k - \mu_i \beta_k - \kappa_{i,k} + \theta_{i,k} = 0$$

$$\mu_i \left(L_T - \sum_{l \in N_T(i)} \sum_{s \in \sigma(l)} \beta_S x_{i \to l}^s\right) = 0$$

$$\lambda_k \left(L_A - \sum_{i \in N_R(k)} x_{i \to j}^k\right) = 0$$

$$\kappa_{i,j,k}(1 - x_{i \to j}^k) = 0$$

$$\theta_{i,k} x_{i \to j}^k = 0 \quad (7)$$

One or more embodiments of the present invention take advantage of this approach to provide a solution via dual decomposition using a distributed algorithm. For a given set of shadow prices for the egress constraints each cell can solve its antenna selection problem locally. For a fixed set of egress shadow prices $\{\mu_i\}$ and ingress shadow price $\lambda_k$, a solution can be approached for a particular user (k) in a single cell (j). For such a user, a solution can be:

$$\frac{\omega_k \beta_k S_{i \to j}^k}{\left[1 + S_{j \to j}^k + \sum_{m \in N_R(k)} S_{m \to j}^k x_{m \to j}^k\right]} - (\mu_i \beta_k + \lambda_k) = \kappa_{i,k} - \theta_{i,k} \,\forall\, i \in N_R(k)$$

In a feasible solution, for $0 < x_{i \to j}^k < 1$, the corresponding $\kappa_{i,k} = 0$ and $\theta_{i,k} = 0$. If there is more than one variable that is neither 1 (ON) or 0 (OFF), equation (6) cannot be solved simultaneously for all variables. In an optimal solution, at most one of the sharing variables can be between 0 and 1; all other variable must be either ON or OFF. For all the variables that are OFF, $(x_1(i \to j) \uparrow k = 0)$, $\theta_{i,k} > 0$ and $\kappa_{i,k} = 0$. For the variables that are fully part of the solution (ON), $\kappa_{i,k} > 0$ and $\theta_{i,k} = 0$. For the single variable that could take a value between 0 and 1, $\kappa_{i,k} = 0$ and $\theta_{i,k} = 0$. With respect to all ON variables, one or more embodiments of the invention compute what is referred to here as aperture feasibility as follows:

$$\frac{\omega_k \beta_k S_{i \to j}^k}{\left[1 + S_{j \to j}^k + \sum_{m \in N_R(k) x_{m \to j}^k = 1} S_{m \to j}^k\right]} > (\mu_i \beta_k + \lambda_k) \,\forall\, i \in N_R(k) : x_{i \to j}^k = \quad (8)$$

$$1 \Rightarrow \left[1 + S_{j \to j}^k + \sum_{m \in N_R(k) : x_{m \to j}^k = 1} S_{m \to j}^k\right] < \min_{i \in N_R(k) : x_{i \to j}^k = 1} \frac{\omega_k \beta_k S_{i \to j}^k}{(\mu_i \beta_k + \lambda_k)}$$

Figure 6:
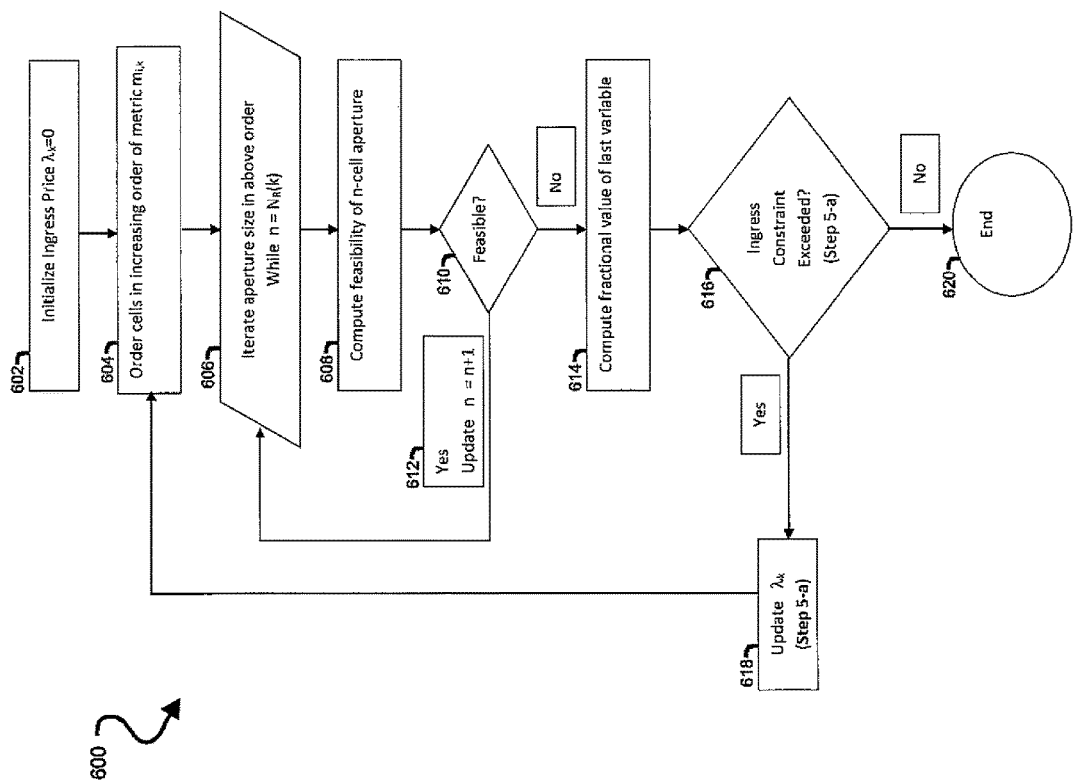
FIGS. 6 and 7 illustrate processes according to embodiments of the present invention.

FIG. 6, then, illustrates a process 600 according to an embodiment of the invention, for selecting a set of transmit nodes (or helper cells) for each receive node (or recipient cell) manifestation. The process 600 will be implemented as part of the process 700 illustrated in FIG. 7 and described in greater detail below.

At block 602, ingress prices are initialized as $\lambda_k = 0$.

At block 604, recipient cells perform antenna/cell selection for helper cells. For every user k in cell j, transmit (helper) cells are ordered according to the metric:

$$m_{i,k} = \frac{\beta_k \mu_i + \lambda_k}{\omega_k \beta_k S_{i \to j}^k}$$

Let the ordered list be $I = \{i_1, i_2, \ldots, i_{L_R}(k)\}$

This is the antenna or cell selection/ordering metric, which accounts for the antenna demand on helper cells apart from (for example) the signal to noise ratio (SINR). This ordering takes the potential help that can be obtained from a helper cell in terms of SINR ($S_1(i \to j) \uparrow k$) and weighs it against the price of obtaining it ($\mu_i$). Thus, if two cells provide approximately the same help in terms of SINR, one may choose the cell that is less "busy" or in demand (smaller $m_{i,k}$).

At block 606, aperture selection is initiated. For example, for user k in cell j, continue to add helper cells (by setting the corresponding $x_{i \to j}^k = 1$) from I in that order, as follows:

At block 608, aperture feasibility is computed. For the n-cell aperture hypothesis (n=1, 2, ..., $L_R(k)$), feasibility is determined by evaluating:

$$\frac{S_{i \to j}^k}{\left[1 + S_{j \to j}^k + \sum_{m \in \{i_1, \cdots, i_n\} \subset I} S_{m \to j}^k\right]} > \frac{\beta_k \mu_i + \lambda_k}{\omega_k \beta_k} = \quad (9)$$

$$T_{aperture}(k, i) i \in \{i_1, \cdots, i_m\}$$

At block 610, a determination is made as to whether the aperture is feasible. If the aperture is feasible, that is, if the above condition is true, this means that the aperture selection based on the first n ordered cells is feasible (as per equation (8) and an increased aperture size can be attempted. Therefore, at block 612 the aperture size can be incremented (n←n+1), and the process returns to block 608. If the condition is not true, the process proceeds to block 614 and the fractional value of the last variable is computed. The first n−1 variables are set to ON—that is, $x_{i \to j}^k = 1, \forall I = 1, 2, \ldots, n-1$, the rest n+1, $L_R(k)$ are set to OFF—that is, $x_{i \to j}^k = 0, \forall I = 1, 2, \ldots L_R(k)$.

$$\frac{\omega_k \beta_k S_{i_n \to j}^k}{\left[1 + S_{j \to j}^k + \sum_{i \in \{i_0, i_1, \ldots, i_{n-1}\}} S_{i \to j}^k + S_{i_n \to j}^k x_{i_n \to j}^k\right]} - (\mu_{i_n} \beta_k + \lambda_k) =$$

$$\kappa_{i_n, k} - \theta_{i_n, k} = 0$$

This results in the assignment:

$$x_{i_n \to j}^k = \max\left\{0, \frac{\omega_k \beta_k S_{i_n \to j}^k / (\beta_k \mu_{i_n} + \lambda_k) - \left[1 + S_{j \to j}^k + \sum_{i \in \{i_0, i_1, \ldots, i_{n-1}\}} S_{i \to j}^k\right]}{S_{i_n \to j}^k}\right\} < 1$$

At block 616, a determination is made as to whether the ingress constraint is exceeded—that is, whether with $\lambda_k = 0$:

$$\hat{L}_R \sum_{i \in N_R} (k) x_{i \to j}^k \leq L_A.$$

If the above expression is true, the ingress constraint is not exceeded and the process ends at block 620, with the result being used in the process 700. If the ingress constraint is exceeded, the process proceeds to block 618 and $\lambda_k$ is updated as follows:

$$\lambda_k \leftarrow \lambda_k - \alpha(L_A - \hat{L}_R)$$

The process then returns to block 604 and a new ordering is performed based on the updated information.

Figure 7:
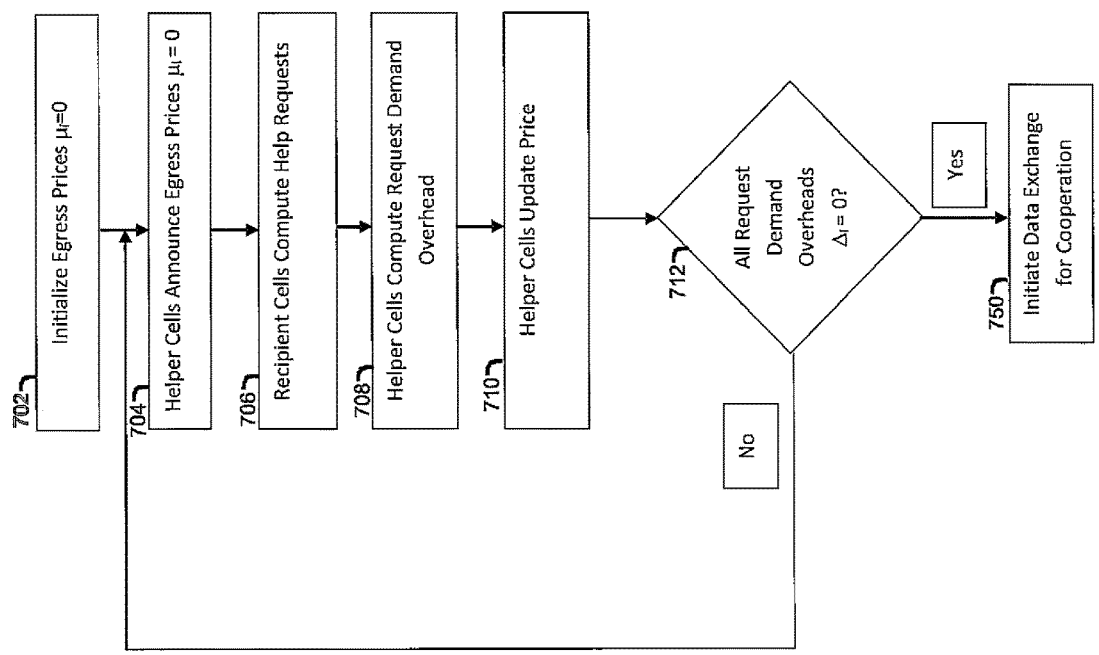

FIG. 7 illustrates a process 700 according to an embodiment of the invention. At block 702, one or more helper cells initialize a set of egress prices $\mu_i = 0$ indicating how much their antennas are in demand from other cells. At block 704, the helper cells announce egress prices $\mu_i \geq 0$.

At block 706, one or more recipient cells compute their help requests using the process 600 described above. At block 708, the helper cells compute request demand.

At block 708, the helper cells update their demand headroom. This is accomplished by computing the egress demand overflow or underflow as follows:

$$\Delta_i = \left( L_T - \sum_{j \in N_T(i)} \sum_{k \in u(j)} \beta_k x_{i \to j}^k \right)$$

where $x_{i \to i}^k$ is the bandwidth request to cell i from user k in cell j (computed by cell j above) for communication to cell i. This demand headroom is positive if the antenna sharing bandwidth being requested is less than the cell's allowed egress bandwidth, and negative otherwise.

At block 710, one or more of the helper cells update their demand prices as follows: $\mu_i \leftarrow [\mu_i - \upsilon \Delta_i]_+$, $\upsilon = 0$, is a small step size, and $[y]_+ = \max\{y, \varepsilon\}$ for some small $\varepsilon > 0$. If a cell is in high demand (that is, if many cells are requesting its antenna data, then that cell's $\mu_i$ value will be high, which indicates that there is a high price to be paid for obtaining that cell's antenna data. If there is little demand on a cell's antenna data, then the constraint will not apply, and due to the complementary slackness condition, $\mu_i \approx 0$. At block 712, a determination is made as to whether convergence has been achieved—whether the arrangement of cells has changed since the previous iteration. If no, the process returns to block 704. If yes, the process proceeds to block 750. The set of egress prices (converged values) indicates the impact of bandwidth constraints. The prices indicate which helper cells are becoming more heavily loaded with help requests, and this can be used to adapt the backhaul network itself to provision more bandwidth to such cells. In addition, a very low egress price (such as 0) at a particular helper indicates that excessive bandwidth has been provisioned at that cell, and this information can inform a decision to reduce the allocation of backhaul bandwidth to that cell.

Cell arrangements can be assembled fully in real-time, where, given a particular set of users that are transmitting (or are to be transmitted to) information is transferred and computations are made in order to achieve an optimum arrangement, in either a centralized or a distributed fashion.

In a centralized architecture, an entity (such as a central controller) may collect information regarding signal strengths, data rates, and other needed information, and implement an iterative solution. The central controller may determine a final set of helpers for each cell, and make assignment links between helpers and recipient cells.

In a distributed architecture, cells may execute blocks iteratively with each block employing local processing either at the helper or the recipient cell, or using some information exchange between the two.

As a further alternative, one or more embodiments of the invention can assemble cell arrangements completely non-real-time (offline), where, for a given network topology and user distribution, an analysis can be performed to determine an optimal set of helper-recipient cell connections. These connections can be then made and the network may operate for a certain specified period of time (for example a few hours) based on those connections. Analysis may be performed in the background as part of Operations and Maintenance (O&M), that constantly runs in the background, and when it detects that the set of helper-recipient connections have significantly changed from the existing configuration, re-forms the connections. Further, the result of this optimization could be used to re-configure the backhaul network itself, by providing more bandwidth to cells that are in heavy demand, as evidenced by their having a high egress price.

Figure 8:
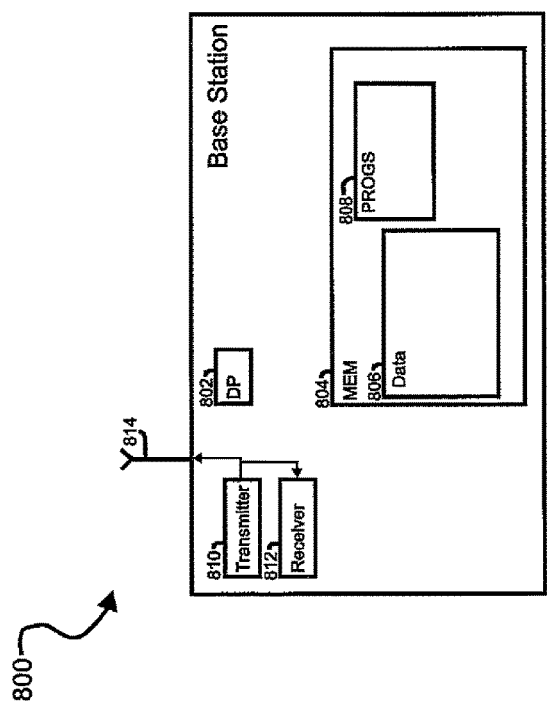
FIG. 8 illustrates elements used in carrying out one or more embodiments of the present invention.

FIG. 8 illustrates details of a base station, implemented as an eNB 800. The eNB 800 may suitably comprise a processor 802 and memory 804. The eNB 800 may employ data 806 and programs (PROGS) 808, residing in memory 804. In addition, the eNB 800 may employ a transmitter 810, receiver 812, and one or more antenna 814. At least one of the PROGs 808 in the eNB 800 is assumed to include a set of program instructions that, when executed by the associated DP 802, enable the device to operate in accordance with one or more exemplary embodiments of this invention, as detailed above. In these regards one or more exemplary embodiments of this invention may be implemented at least in part by computer software stored on the MEM 804, which is executable by the DP 802 of the eNB 800, or by hardware, or by a combination of tangibly stored software and hardware (and tangibly stored firmware). Electronic devices implementing these aspects of the invention need not be the entire devices as depicted at FIG. 1 or FIG. 8 or may be one or more components of same such as the above described tangibly stored software, hardware, firmware and DP, or a system on a chip SOC or an application specific integrated circuit ASIC.

Various embodiments of the computer readable MEM 804 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 802 include but are not limited to general purpose computers, special purpose computers, microprocessors, digital signal processors (DSPs) and multi-core processors.

Electronic devices implementing these aspects of the invention need not be the entire devices as depicted at FIG. 1 or FIG. 8 or may be one or more components of same such as the above described tangibly stored software, hardware, firmware and DP, or a system on a chip SOC or an application specific integrated circuit ASIC.

In an embodiment of the invention, a method comprises, by a cell operating in a first operational category as a recipient cell and seeking bandwidth assistance from one or more of a plurality of cells operating in a second operational category as a helper cell and available for bandwidth assistance, identifying and ordering cells operating in the second operational category based on, for example, signal to noise ratio improvements and/or impact on bandwidth available to cells operating in the first operational category cells.

In another embodiment of the invention, the method further comprises, by the cell operating in the first operational category, iteratively ordering and assembling sets of cells operating in the second operational category based on, for example, recalculated signal to noise ratio and/or bandwidth impact calculations.

In another embodiment of the invention, in response to an initial request for help from one or more cells operating in the first operational category, a cell operating in the second operational category broadcasts a demand price and demand headroom.

In another embodiment of the invention, at least one recipient cell operating in the first operational category collects demand price and/or headroom information for one or more cells operating in the second operational category, to which it is connected, and assembles and orders a set of helper cells operating in the second operational category and makes a request for help to the set of cells operating in the second operational category based on the broadcast demand prices.

In another embodiment of the invention, one or more cells operating in the second operational category recompute demand headroom and set new demand prices based on the requests from the cells operating in the first operational category and broadcast new demand prices and demand headroom information.

In one embodiment of the invention, a set of one or more cells operating in the second operational category is assembled so as to maximize a signal to noise ratio criterion subject to an ingress aperture limit, and egress bandwidth limit, and a sharing variable.

In another embodiment of the invention, a method comprises, for a cell operating in a first operational category in which the cell is seeking bandwidth assistance in cooperative multipoint processing from one or more of a plurality of cells operating in a second operational category in which the cells are available to provide bandwidth assistance, identifying and ordering potential helper cells based on iteratively computing ingress prices bounded by an ingress constraint.

In another embodiment of the invention, the ingress constraint comprises a computational complexity constraint based on the maximum number of cell signals that can be processed by a receiver of a base station serving the cell.

In another embodiment of the invention, iteratively computing ingress prices comprises iteratively incrementing multiple antenna aperture size for the recipient cell until the maximum feasible aperture is exceeded.

In another embodiment of the invention, identifying and ordering the cells operating in the second operational category comprises computing a fractional value of the last variable computed before the maximum feasible aperture size was reached and determining if the ingress constraint was exceeded.

In another embodiment of the invention, the method further comprises, if the ingress constraint was exceeded, updating the ingress prices and recomputing an ordering of the potential helper cells.

In another embodiment of the invention, the method further comprises, if the ingress constraint was not exceeded, computing a final ordering of cells in the second operational category.

In another embodiment of the invention, the identification and ordering is performed by a central controller based on data from a plurality of helper cells and recipient cells.

In another embodiment of the invention, the identification and ordering is performed by each of one or more recipient cells.

In another embodiment of the invention, a method comprises, for at least one cell operating as a helper cell in the second operational category and available to provide bandwidth assistance in cooperative multipoint processing, receiving at least one help request from one or more recipient cells operating in the first operational category and seeking bandwidth assistance in cooperative multipoint processing, broadcasting an egress price for the cell operating in the second operational category, receiving at least one help request specifying an ordered ranking of cells operating in the second operational category, and, based on the one or more received help requests, iteratively computing request demand overhead and updating egress prices until the update price change for an iteration is below a specified threshold.

In another embodiment of the invention, the request demand overhead is determined based at least in part on the relationship of request demand to the egress constraint for the helper cell, wherein the egress constraint for a cell is based at least in part on a backhaul communication bandwidth constraint for the cell.

In another embodiment of the invention, iteratively computing request demand overhead is performed by a central controller based on data from one or more of a plurality of helper cells and recipient cells.

In another embodiment of the invention, network optimization is performed based at least in part on identification of cells in heavy demand.

In another embodiment of the invention, identification of cells in heavy demand comprises identification of cells having a low request demand overhead.

In another embodiment of the invention, an apparatus comprises at least one processor and memory storing a program of instructions. The memory storing the program of instructions is configured to, with the at least one processor, cause the apparatus to at least, for a cell operating in a first operational category in which the cell is seeking bandwidth assistance in cooperative multipoint processing from one or more of a plurality of cells operating in a second operational category in which the cells are available to provide bandwidth assistance, identifying and ordering potential helper cells based on iteratively computing ingress prices bounded by an ingress constraint.

In another embodiment of the invention, an apparatus comprises at least one processor and memory storing a program of instructions. The memory storing the program of instructions is configured to, with the at least one processor, cause the apparatus to at least, for at least one cell operating in the second operational category and available to provide bandwidth assistance in cooperative multipoint processing, receiving at least one help request from one or more cells operating in the first operational category and seeking bandwidth assistance in cooperative multipoint processing, broadcasting an egress price for the cell operating in the second operational category, receiving at least one help request from one or of the cells operating in the first operational category, wherein the help requests specify an ordered ranking of cells operating in the second operational category, and, based on the received help requests, iteratively computing request demand overhead and updating egress prices until the updated price change for an iteration is below a specified threshold.

In another embodiment of the invention, a computer readable medium stores a program of instructions. Execution of the program of instructions by least one processor configures an apparatus to at least, for a cell operating in a first operational category in which the cell is seeking bandwidth assistance in cooperative multipoint processing from one or more of a plurality of cells operating in a second operational category in which the cells are available to provide bandwidth assistance, identifying and ordering potential helper cells based on iteratively computing ingress prices bounded by an ingress constraint.

In another embodiment of the invention, a computer readable medium stores a program of instructions. Execution of the program of instructions by least one processor configures an apparatus to at least, for at least one cell operating in the second operational category and available to provide bandwidth assistance in cooperative multipoint processing, receiving at least one help request from one or more cells operating in the first operational category and seeking bandwidth assistance in cooperative multipoint processing, broadcasting an egress price for the cell operating in the second operational category, receiving at least one help request from one or of the cells operating in the first operational category, wherein the help requests specify an ordered ranking of cells operating in the second operational category, and, based on the received help requests, iteratively computing request demand overhead and updating egress prices until the update price change for an iteration is below a specified threshold.

In another embodiment of the invention, an apparatus comprises means for, for a cell operating in a first operational category in which the cell is seeking bandwidth assistance in cooperative multipoint processing from one or more of a plurality of cells operating in a second operational category in which the cells are available to provide bandwidth assistance, identifying and ordering potential helper cells based on iteratively computing ingress prices bounded by an ingress constraint.

In another embodiment of the invention, an apparatus comprises means for, for at least one cell operating in the second operational category and available to provide bandwidth assistance in cooperative multipoint processing, receiving at least one help request from one or more cells operating in the first operational category and seeking bandwidth assistance in cooperative multipoint processing, broadcasting an egress price for the cell operating in the second operational category, receiving at least one help request from one or of the cells operating in the first operational category, wherein the help requests specify an ordered ranking of cells operating in the second operational category, and, based on the received help requests, iteratively computing request demand overhead and updating egress prices until the update price change for an iteration is below a specified threshold.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. An apparatus comprising:
   at least one processor;
   memory storing a program of instructions;
   wherein the memory storing the program of instructions is configured to, with the at least one processor, cause the apparatus to at least:
   request bandwidth assistance from one or more cells operating in a network;
   in response to at least one of demand price information and headroom information provided by a plurality of cells receiving the request, identify a set of potential helper cells and place the potential helper cells in order by rank;
   select one or more helper cells from the ordered set and assemble a set of helper cells based on bandwidth performance assistance criteria;
   determine whether the set of helper cells is suitable for use, wherein determining whether the set of helper cells is suitable for use comprises following assembly of the set of helper cells by:
   making a new request for bandwidth assistance;
   in response to at least one of new demand price information and new headroom information obtained from the set of helper cells, determine if sufficient iterations have been performed;
   if sufficient iterations have not been performed, returning to the step of requesting bandwidth assistance from the one or more cells operating in the network; and
   if sufficient iterations have been performed, proceed to operate while receiving bandwidth assistance from the assembled set; and
   in response to a determination that the set of helper cells is suitable for use, proceed to operate while receiving bandwidth assistance from the set of helper cells.

2. The apparatus of claim 1, wherein bandwidth performance assistance criteria comprise signal to interference and noise ratio, and wherein members of the set of helper cells are selected based at least in part on whether they meet specified signal and interference to noise ratio criteria.

3. The apparatus of claim 1, wherein determining if sufficient iterations have been performed comprises determining if a specified number of iterations have been performed.

4. The apparatus of claim 1, wherein determining if sufficient iterations have been performed comprises determining if performance offered by the updated set of helper cells represents an improvement over that offered by the previously assembled set of helper cells.

5. The apparatus of claim 4, wherein assembly of the set comprises iteratively computing ingress prices for potential members of the assembled set of helper cells, wherein the ingress prices are computed using the ingress constraint bound.

6. The apparatus of claim 4, wherein the ingress constraint comprises a computational complexity constraint based on the maximum number of cell signals that can be processed by a receiver of a base station serving the cell.

7. The apparatus of claim 1, wherein assembly of the set of helper cells is bounded by an ingress constraint, wherein the ingress constraint comprises a limit on the total backhaul bandwidth that can be consumed or the number of inputs that can be processed by a receiver processing unit.

8. The apparatus of claim 1, wherein identification of potential helper cells comprises identifying cells for antenna sharing.

9. The apparatus of claim 8, wherein assembly of a set of helper cells comprises assembling the set of helper cells so as to maximize per-user antenna connectivity sharing.

10. The apparatus of claim 1, wherein the cells are operating in a small-cell cluster.

11. The apparatus of claim 1,
   wherein the demand price information provides information of an impact on or a cost to a potential helper cell concerning a measurement of usage of spare bandwidth space of the potential helper cell, and
   wherein the demand headroom information provides information of a difference between a bandwidth limit and a current requested bandwidth.

12. A method comprising:
   requesting bandwidth assistance from one or more cells operating in a network;
   in response to at least one of demand price information and headroom information provided by a plurality of cells receiving the request, identifying a set of potential helper cells and place the potential helper cells in order by rank;

selecting one or more helper cells from the ordered set and assemble a set of helper cells based on bandwidth performance assistance criteria;

determining whether the set of helper cells is suitable for use, wherein determining whether the set of helper cells is suitable for use comprises following assembly of the set of helper cells by: making a new request for bandwidth assistance;

in response to at least one of new demand price information and new headroom information obtained from the set of helper cells, determine if sufficient iterations have been performed;

if sufficient iterations have not been performed, returning to the step of requesting bandwidth assistance from the one or more cells operating in the network; and if sufficient iterations have been performed, proceed to operate while receiving bandwidth assistance from the assembled set; and in response to a determination that the set of helper cells is suitable for use, proceeding to operate while receiving bandwidth assistance from the set of helper cells.

13. The method of claim 12, wherein bandwidth performance assistance criteria comprise signal to interference and noise ratio, and wherein members of the set of helper cells are selected based at least in part on whether they meet specified signal and interference to noise ratio criteria.

14. The method of claim 12, wherein determining if sufficient iterations have been performed comprises determining if a specified number of iterations have been performed.

15. The method of claim 12, wherein determining if sufficient iterations have been performed comprises determining if performance offered by the updated set of helper cells represents an improvement over that offered by the previously assembled set of helper cells.

16. The apparatus of claim 12,
wherein the demand price information provides information of an impact on or a cost to a potential helper cell concerning a measurement of usage of spare bandwidth space of the potential helper cell, and
wherein the demand headroom information provides information of a difference between a bandwidth limit and a current requested bandwidth.

17. A computer program product embodied on a non-transitory computer-readable medium in which a computer program is stored that, when being executed by a computer, is configured to provide instructions to at least control or perform:

requesting bandwidth assistance from one or more cells operating in a network in a wireless communications system;

in response to at least one of demand price information and demand headroom information provided by a plurality of cells receiving the request, identifying a set of potential helper cells and place the potential helper cells in order by rank;

selecting one or more helper cells from the ordered set and assemble a set of helper cells based on bandwidth performance assistance criteria;

determining whether the set of helper cells is suitable for use, wherein determining whether the set of helper cells is suitable for use comprises following assembly of the set of helper cells by:

making a new request for bandwidth assistance;

in response to at least one of new demand price information and new headroom information obtained from the set of helper cells, determine if sufficient iterations have been performed;

if sufficient iterations have not been performed, returning to the step of requesting bandwidth assistance from the one or more cells operating in the network; and if sufficient iterations have been performed, proceed to operate while receiving bandwidth assistance from the assembled set; and in response to a determination that the set of helper cells is suitable for use, proceeding to operate while receiving bandwidth assistance from the set of helper cells.

18. The computer program product of claim 17, wherein bandwidth performance assistance criteria comprise signal to interference and noise ratio, and wherein members of the set of helper cells are selected based at least in part on whether they meet specified signal and interference to noise ratio criteria.

19. The computer program product of claim 17,
wherein the demand price information provides information of an impact on or a cost to a potential helper cell concerning a measurement of usage of spare bandwidth space of the potential helper cell, and
wherein the demand headroom information provides information of a difference between a bandwidth limit and a current requested bandwidth.

* * * * *

UNITED STATES PATENT AND TRADEMARK OFFICE
CERTIFICATE OF CORRECTION

PATENT NO. : 10,044,414 B2
APPLICATION NO. : 14/879546
DATED : August 7, 2018
INVENTOR(S) : Shirish Nagaraj, Michael Honig and Khalid Zeineddine Page 1 of 1

It is certified that error appears in the above-identified patent and that said Letters Patent is hereby corrected as shown below:

In Claim 16:
Column 17, Line 36, "apparatus" should be deleted and -- method -- should be inserted.

Signed and Sealed this
Nineteenth Day of February, 2019

Andrei Iancu
*Director of the United States Patent and Trademark Office*